United States Patent [19]

Searle

[11] 4,337,113
[45] Jun. 29, 1982

[54] APPARATUS FOR MANUFACTURE OF SLEEVES AND/OR POCKETS FOR SEPARATOR PLATES

[76] Inventor: Clifford A. Searle, "Kynance", Moffatt Rd., Forest Green, Nailsworth, Gloucestershire, England

[21] Appl. No.: 195,306

[22] Filed: Oct. 8, 1980

[30] Foreign Application Priority Data

Oct. 19, 1979 [GB] United Kingdom ................. 7936395

[51] Int. Cl.³ ...................... B26D 5/38; B32B 31/08; B32B 31/12; B32B 31/18; B32B 31/20
[52] U.S. Cl. .............................. 156/353; 156/244.19; 156/244.22; 156/244.24; 156/267; 156/292; 156/305; 156/362; 156/390; 156/391; 156/498; 156/500; 156/510; 156/563
[58] Field of Search ............... 156/353, 362, 390, 391, 156/498, 500, 510, 563, 292, 305, 244.19, 244.22, 244.24, 267

[56] References Cited

U.S. PATENT DOCUMENTS

| | | | |
|---|---|---|---|
| 3,759,771 | 9/1973 | Battersby | 156/292 |
| 4,014,733 | 3/1977 | Loubet | 156/500 |
| 4,059,466 | 11/1977 | Scholl et al. | 156/500 |
| 4,086,119 | 4/1978 | Veechiotty | 156/292 |
| 4,145,237 | 3/1979 | Mercier et al. | 156/500 |
| 4,186,685 | 2/1980 | Chevel | 156/500 |
| 4,216,046 | 8/1980 | Hackert | 156/292 |

Primary Examiner—James C. Cannon
Attorney, Agent, or Firm—Cushman, Darby and Cushman

[57] ABSTRACT

Apparatus for manufacturing separator sleeves and/or pockets, for the reception of battery plates, seals the edge gaps of a sandwich of two separators and a plate with an extruded ribbon of plastics material. The sandwich is automatically assembled in an assembly section, from stacks of separators in separate magazines and a stack of plates in a further magazine. The assembled sandwich is fed to a sleeve-sealing section, with a conveyor which conveys the sandwich past extruders which seal the side edges. Water-cooled blocks cool and size the sealed edges, and rotary cutters under the control of sensors trim off excess plastics material extruded between successive sandwiches. At the end of the conveyor the sealed sleeves are fed on to a delivery table, if sleeve products are required, or passed on to a further conveyor of a pocket-sealing section if pockets are required. In the latter section, at one side of the conveyor, an extruder and cooling and cutting means operate as in the sleeve-sealing section but in this case act to seal only the bottom edge gap of the sandwiches to produce pockets.

10 Claims, 7 Drawing Figures

APPARATUS FOR MANUFACTURE OF SLEEVES AND/OR POCKETS FOR SEPARATOR PLATES

BACKGROUND OF THE INVENTION

1. Field of the Invention

This invention relates to the manufacture of sleeves and/or pockets from separator plates for use in the construction of batteries, for example of the lead-acid type. It relates particularly to apparatus for use in such manufacture.

2. Description of the Prior Art

In a lead-acid battery the plates thereof are positioned in the battery casing interleaved with separators disposed between the plates. Various plate/separator combinations are employed, and it is known to house each plate in a pre-formed sleeve consisting of two spaced separators the side edge gaps of which are sealed with a ribbon of plastics material. The invention is concerned with apparatus for the manufacture of such sleeves, and contemplates also the sealing of the bottom edge gap between the separators to produce a complete pocket in which the corresponding battery plate is or can be received.

The separators are in the form of sheets formed from a special material, often with a ribbed surface on at least one side. This makes the interconnection and sealing of the side edge gaps more difficult, known methods of manufacture being of an entirely hand-assembly nature.

SUMMARY OF THE INVENTION

The principal object of the invention is to provide apparatus which mechanises the known entirely hand-assembly process, at least in the sealing stage when the pocket itself is formed. A further object is to provide such apparatus in which the mechanisation thereof is extended to produce complete separator pockets containing or adapted to contain the corresponding battery plates.

The invention provides apparatus for the manufacture of a separator sleeve or pocket employing the steps of forming an assembly of two separators with a plate sandwiched between them at an assembly region, feeding that assembly to a sealing region in which relative linear motion of the assembly and extrusion means is produced with extrusion of molten settable plastics sealing material into the gaps between the side edges of the separators, causing or allowing the extruded plastics material to set thereby producing a sleeve containing the plate, cutting away excess plastics material extruded beyond the ends of the separators, and feeding the sealed sleeve to a delivery zone or to a transitional conveyor zone if complete pockets are to be manufactured. In the latter case the manufacture includes the further steps of conveying the sealed sleeve from the transitional conveyor zone to a further sealing region in which relative linear motion of the sleeve and further extrusion means is produced, in a direction at right angles to the first-mentioned relative linear motion, with extrusion of plastics material into the bottom edge gap of the sleeve, causing or allowing the so-extruded material to set thereby producing a complete pocket containing the plate, cutting away plastics material extruded beyond the side edges of the separators, and feeding the complete pocket to a further delivery zone.

The plate used in the separator/plate sandwich formed at the assembly region may be the actual battery plate which the sleeve or pocket is to contain. Alternatively it may be a dummy plate which is withdrawn from the sleeve or pocket at an appropriate stage so that an empty sleeve or pocket is produced, in which case it is preferably withdrawn before delivery of the completed sleeve, or pocket, from the apparatus.

Apparatus for carrying out the foregoing manufacture, according to the invention, specifically comprises an assembly table or the like providing said assembly region, means for feeding the separator/plate sandwich assembly from the table to a linear conveyor for conveying the sandwich through said sealing region past an array comprising an extruder head for the plastics material, and means for cutting off excess extruded material beyond the ends of the separators while travelling along the conveyor.

The apparatus may include a further conveyor leading at right angles from the end of the first conveyor and optionally operable for carrying the sleeves past a further sealing array for sealing the ends to form pockets.

The sandwich may be assembled on the assembly table by hand, but the apparatus of the invention preferably incorporates automatic sandwich assembly. Thus, the assembly table may be associated with magazines to hold a supply of separators and plates, means for removing a first separator from the corresponding magazine and placing it on to an assembly area of the table, means for moving a plate from the corresponding magazine to a position above the first separator and a support for holding the so-positioned plate clear of the first separator, means for removing a second separator from the corresponding magazine and placing it on the plate, and means for removing the support to allow the plate with the second separator to drop on to the first separator to provide the separator/plate sandwich assembly for feeding to the first conveyor.

Said support may comprise ledges movable from the sides into and out of the path of introduction of the plate, and there may also be centralising members movable on to the opposite side edges of the plate after it has been allowed to drop on to the first separator.

The moving parts of the apparatus of the invention may readily be mainly operated by hydraulic or pneumatic rams, the operation of which is controlled by fluid logic circuits.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENT

Figure 1:
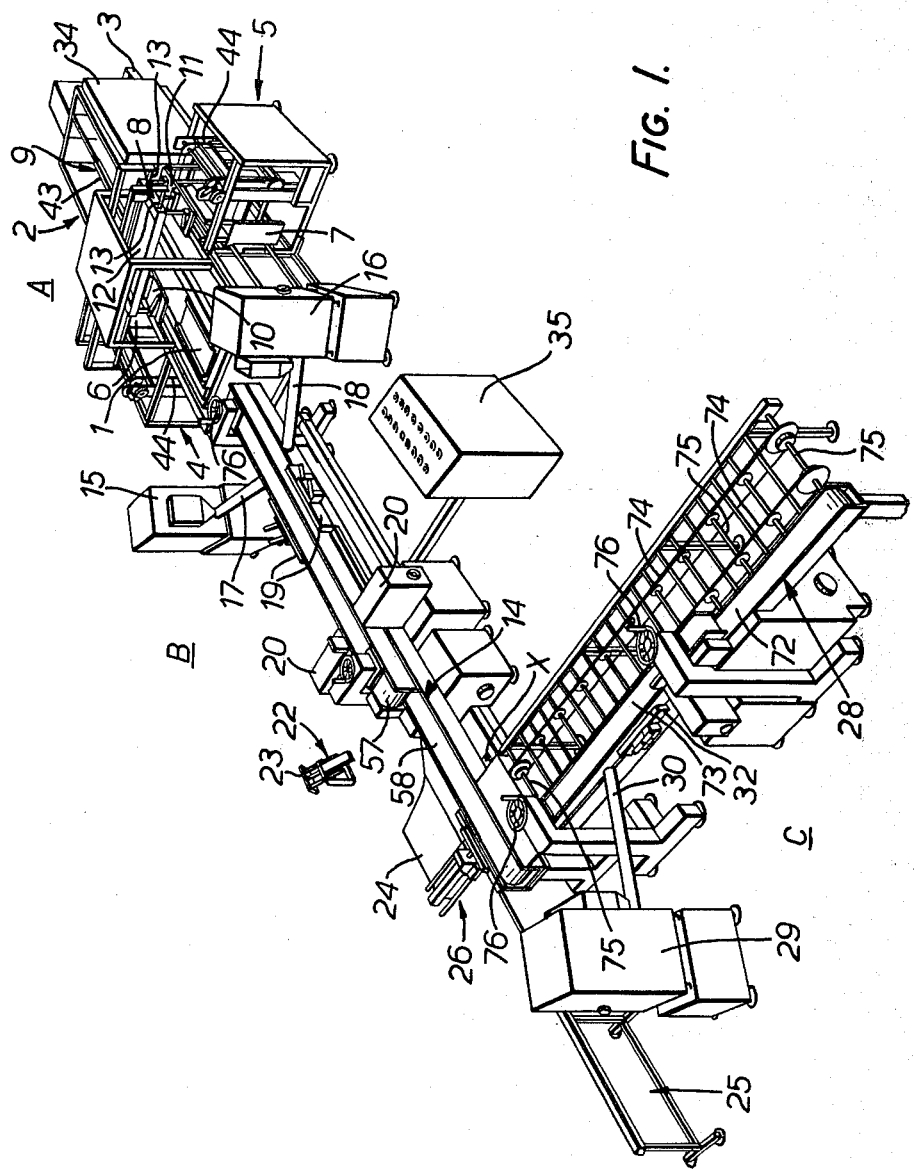
FIG. 1 is a general arrangement perspective view of a preferred form of the apparatus embodying the invention, and operable for the manufacture of separator sleeves or plates.

The apparatus, illustrated somewhat diagrammatically in FIG. 1, comprises three main sections. A separator/plate sandwich assembly section A is followed by a sleeve-sealing section B, which is followed in turn by an optional pocket-sealing section C. These will now be briefly described sufficiently for the overall operation of the machine to be appreciated, and thereafter various important features will be described in some detail.

The assembly section A comprises a reciprocable assembly table 1, a magazine 2 (loaded by a free-roller conveyor 3) to contain a supply of battery (or dummy) plates, two identical magazines 4 and 5 (with loading carriages 6 and 7) respectively disposed on opposite sides of the table 1 and to contain supplies of separators, pick-up means 8 for removing separators in turn from the magazines 4 and 5 and depositing them accurately on the table 1, means 9 for successively moving the plates from a stack thereof in the magazine 2 on to the table 1 and means 44 for successively moving the plates from the stacks in magazines 4 and 5 on to the table 1.

The pick-up means 8 comprise two vacuum heads 10 and 11, which respectively operate at the magazines 6 and 7 and which are mounted on a laterally reciprocable carriage 12 mounted on parallel guide rods 13. The heads 10 and 11 are moved vertically by pneumatic rams in timed synchronism with carriage reciprocation, in such manner that as the head 10 picks up a fresh separator from the magazine 4, the head 11 deposits a first separator, previously picked up from the magazine 5, on to the table 1. As carriage 12 moves across the reverse the roles of the heads 10 and 11, the plate-moving means 9 delivers a plate from the magazine 5 to the table 1 above the separator already deposited, ready for deposition of a second separator by the head 10 to complete the separator/plate sandwich on the table 1.

The assembled sandwich is fed, by forward movement of the table 1, to the section B which comprises a linear nip conveyor 14. This grips and conveys the sandwich through a sleeve-sealing region past a sealing array of two extruders 15 and 16 with extruder heads 17 and 18 the nozzles of which respectively extrude a ribbon of molten plastics material into the side edge gaps of the passing sandwich. The section B further includes sizing/cooling assemblies 19, which determine the edge thickness and overall width of the sealed sleeves and cool the extruded plastics material to accelerate setting thereof. After leaving the assemblies 19, with side edges sealed and cooled, the sealed sleeves are conveyed past rotary cutter units 20 operable to trim off the excess extruded material between the sleeves. The provision of these cutter units enables continuous extrusion to be employed, the trimmed-off material being recycled or scrapped.

At one side of the conveyor 14 and adjacent the end thereof a push-off unit 22 is mounted. This unit is an optional attachment and is for convenience shown detached in FIG. 1; when fitted it is bolted on at the position marked X. If the apparatus is used for producing sleeves as the end product a reciprocable pusher 23 of this unit 22 is operated, in timed synchronism with conveyor movement, to displace the sleeves off the conveyor 14 sideways on to a receiving table 24. If a dummy plate has been used to form a sandwich a plate-withdrawal unit 25 operates, while the sleeve is on the table 24, to withdraw the plate to produce an empty sleeve.

If pockets are to be produced, the sealed sleeves are successively delivered to the section C on the other side of the conveyor 14 by a transfer head 26 of the section B. A reciprocable pusher 27 displaces the sleeves laterally on to a linear nip conveyor 28 of the section C. As the sandwich is conveyed in the section C it moves past an extruder 29 with extruder head 30, a cooling/sizing assembly 32 and a cutter unit 33 which operate to seal, cool, size and trim the bottom edge gap (thus providing a pocket product) as with the side edges in the section B.

The sections A, B and C are free-standing independent assemblies. Thus section C may be omitted if the production of sleeves only is required, and it can be added at a later date if it is desired so to extend the apparatus. Similarly the automatic assembly section A may be replaced by a more simple assembly table arrangement with hand assembly of the sandwiches, at the expense of lower output and/or lower productivity. The various reciprocably moving parts of the apparatus are controlled by pneumatic rams, the operation of which is controlled by fluid logic circuits employing positional sensors at appropriate locations. The three sections A, B and C are under common control, a pneumatic control panel 34 being shown in this instance fixed to the side of the magazine 5. Electrical control of the apparatus, for example of the extruders, conveyor drives, cooling water circulation and cooling air fans etc., is from a common electrical control cabinet 35.

Various important features of the apparatus will now be described in greater detail with particular reference to the remaining drawing figures.

Figure 2:
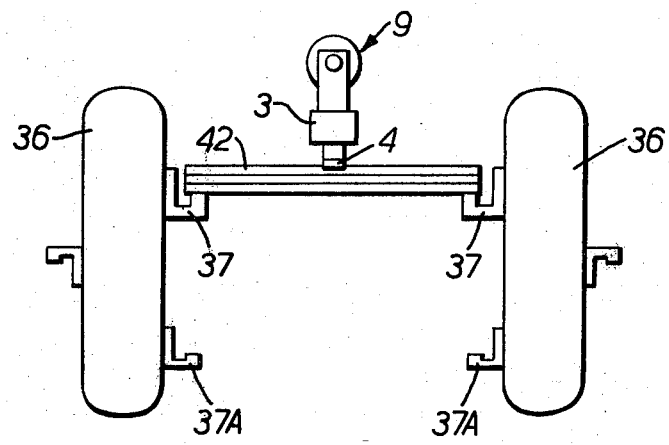
FIG. 2 is a detail view, shown to a larger scale and somewhat diagrammatically, of a separator/plate sandwich assembly section of the apparatus.
Figure 3:
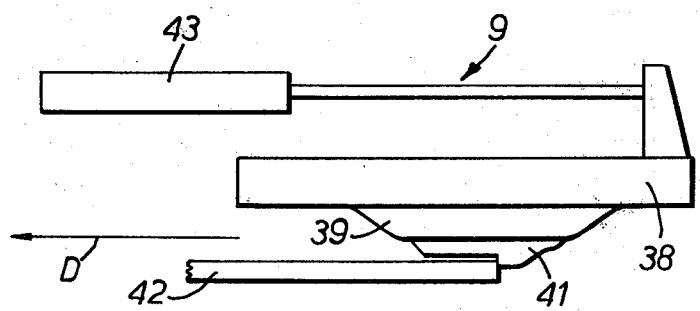
FIG. 3 is a further detail view of the separator/plate sandwich assembly section.

In the magazine 2 the supply of plates is loaded as a stack along the roller conveyor 3, and the stack is picked up by a pair of chain conveyors 36 (FIG. 2) carrying pairs of ledges 37 and indexed upwardly in steps towards an arm 38 of the plate-moving means 9. The arm 38 (FIG. 3) carries, via a leaf spring 39, a pawl catch 41 which engages the top plate 42 of the stack thereof. A ram 43 operates to deliver the plate 42 to the table 1 in the direction of the arrow D, after which the ram extends to return the arm/pawl assembly 38,41 to engage behind the next plate. As the plate stack approaches exhaustion a fresh stack, already loaded along the conveyor 3, is picked up by the next pair of ledges 37A on the conveyors 36. After the top plate 42 has been delivered the indexing means operates to move the whole stack upwardly until a sensor determines that the next plate is at the delivery level.

The magazines 4 and 5 employ similar conveyor/ledge arrangements 44. However, the fresh stacks of separators are loaded in on drawer-like loading carriages 6 and 7 at the appropriate times.

Figure 4:
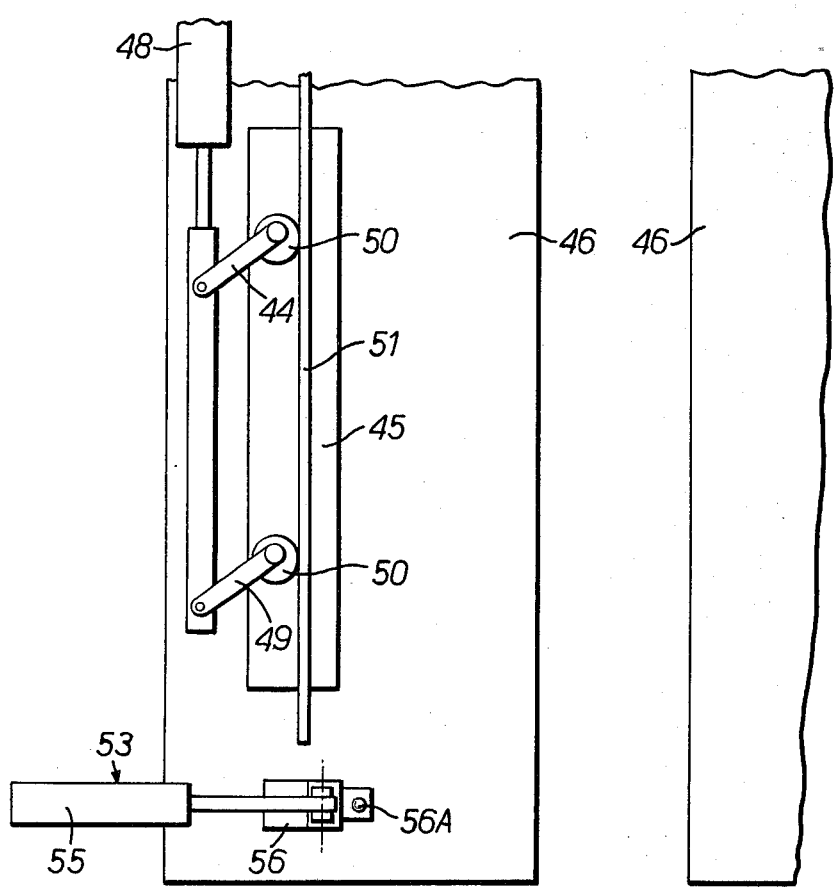
FIG. 4 is another detail view of the separator/plate sandwich assembly section.

To allow the plates to be delivered to the table 1 without displacing the first separator already deposited, they are initially delivered on a pair of ledges 45 (FIGS. 4 and 5) above the assembly region provided by the table surfaces 46. After the plate 42 has been correctly positioned above the first separator 47 each of the ledges 45 is withdrawn by operation of a corresponding ram 48 which, through levers 49, turns eccentric cams 50 pivoted on the corresponding ledge 45 and acting against a fixed guide rib 51. As the plate 42 is delivered it is guided into the correct assembly position between the guide ribs 51 and, when fully withdrawn to allow the positioned plate to drop on to the separator below, the inner edges of the ledges 45 are aligned with the inner edges of the guide ribs 51. It will be appreciated that the ledges 45 remain withdrawn until the first separator of the next sandwich has been delivered to the table with the guide ribs 51 acting to centre the separators. A similar arrangement (not shown) to that comprising the rams 48 and lever-operated cams 50 causes a row of fingers or cams 52, at each side, to engage the edges of the plate 42 and thus centralise it between the ribs 51.

Figure 5:
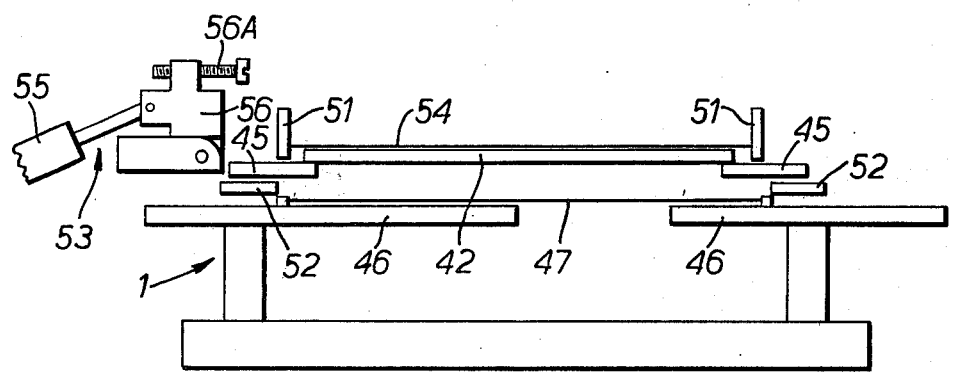
FIG. 5 is yet another detail view of the separator/plate sandwich assembly section.

After withdrawal of the centralising fingers 52 a pair of gripping devices 53, only one of which is shown in FIG. 5, operate to hold down at both sides the front edges of the sandwich comprising first separator 47, plate 42 and a second separator 54 delivered between the ribs 51 on to the plate. Each device 53 comprises a ram 55 which acts on a pivotal clamping lever 56 with an adjustable clamping screw 56A which engages the top separator 54. With the sandwich so gripped the table 1 is moved forwardly carrying the sandwich to the nip of the conveyor 14, at this time the devices 53 being released.

Figure 6:
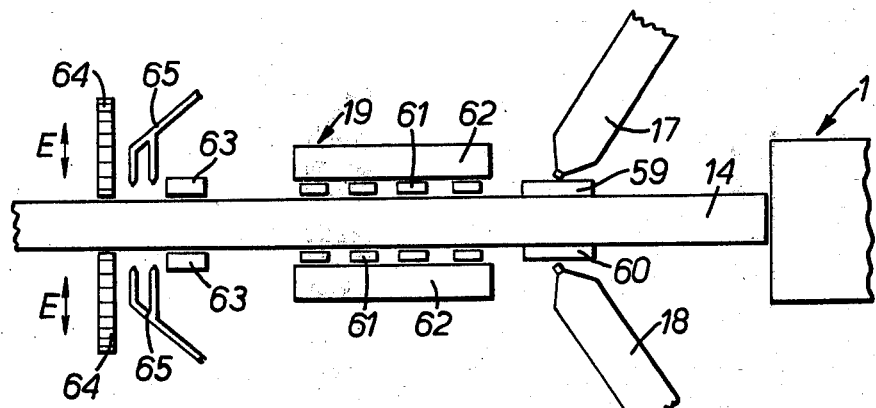
FIG. 6 is a similar detail plan view of a sleeve-sealing section.

FIG. 6 illustrates diagrammatically the further progress of the sandwich after its removal from the assembly table 1. The sandwich is gripped by the conveyor 14, comprising upper and lower endless belts 57 and 58, and is carried through said sealing region. Firstly the hot molten plastics material, usually in foam form, is injected from the extrusion guns 17,18 between respective pairs of fixed plates 59,60 and thus into the edge gaps between the separators 47 and 54. The separator edges then pass through the assemblies 19 comprising a line of rollers 61 which squeeze the foamsealed edges to a desired thickness. At the same time the foam is cooled by sizing and cooling plates 62 with internal waterways through which cold water circulates. At a further position the front edge of the separators is sensed by colour sensors 63 which respectively control movement of continuously rotating cutter wheels 64 of the units 20 in the direction of the double arrow E. The cutter wheels 64 are held away from the sealed sandwich while it passes the cutter units 20. Between the sensors 63 and the cutter wheels 64 air jets 65 act on the plastics material to produce further cooling. When the rear edge of the separators passes the colour sensors 63 this is noted and a signal is fed to the cutter units 20 with the result that the cutter wheels 64 move into position immediately behind the sandwich so as to trim off the excess ribbon of extruded material behind the sandwich. The cutters remain in place until the front end of the next sandwich arrives, whereupon they are withdrawn in response to appropriate command signals from the colour sensors 63.

Figure 7:
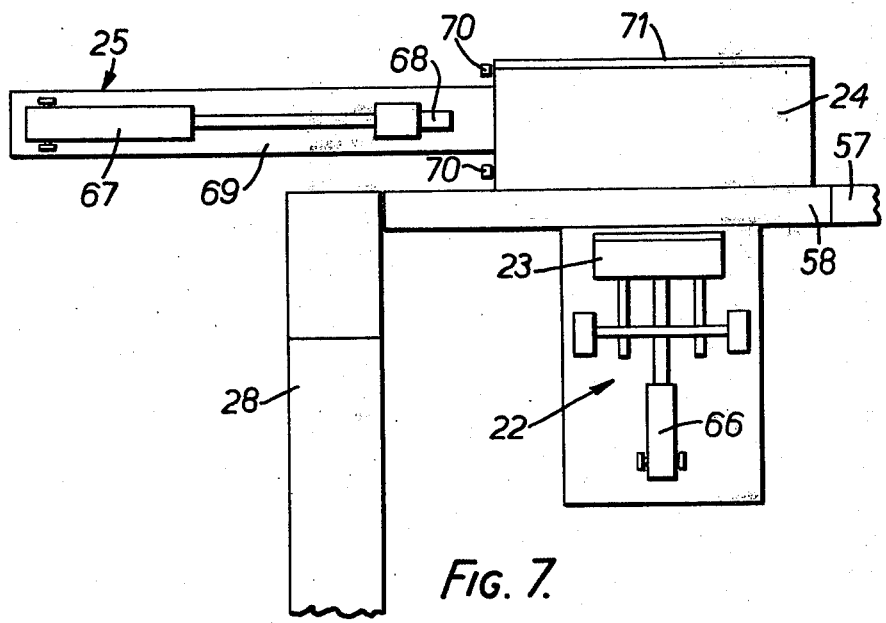
FIG. 7 is a similar detail plan view of a transitional zone between the sleeve-sealing section and a pocket-sealing section of the apparatus.

FIG. 7 illustrates the transitional zone at the end of section B and shows the push-off unit 22, with an operating ram 66, in position. It also illustrates the dummy plate withdrawal unit, which comprises a ram 67 carrying a gripping finger 68 designed to grip a protruding edge formation of the dummy plate and to carry it back on to a platform 69 while the now-empty sealed sleeve is retained on the platform 24 by stop members 70. The removed plate can be taken from the platform 69 by some further handling device and the sleeve is delivered from the table 24. To this end the latter is inclined and the sleeve-plate assembly is delivered thereto to rest against a bottom edge ledge 71. After removal of the dummy plate the table 24 is pivoted upwardly, about an upper edge pivot axis, by a ram (not shown) disposed underneath. This causes the sleeve to be delivered, by gravity, over the ledge 71.

The conveying and sealing arrangements of sections B and C are more or less identical. However, as the pockets will normally be of greater depth than width the conveyor 28 of section C provides wider support. In addition to the lower and upper endless belts 72 and 73, similar to those of the earlier conveyor 14, the conveyor 28 is extended laterally by endless bands 74 running on pulley shafts such as 75, the end two of the latter being driven with the conveyor belt 72.

Although this is not shown, it will be appreciated that a table such as 24 and associated parts, including a plate withdrawal unit such as 25, could if desired be mounted at the end of the conveyor 28 to receive the sealed pockets and there extract the dummy plates. Also, if the apparatus is to be used only to produce sleeves not only will the section C be omitted but also the transfer head 26 at the end of section B. The apparatus is fully adjustable to accept and seal a considerable range of plate and separator sizes, and the handwheels 76 shown are provided for adjustment of the nips of the conveyors to suit the actual sandwich thickness.

I claim:

1. Apparatus for use in the manufacture of a separator sleeve or pocket, comprising an assembly table or the like providing a region for the assembly of a separator/plate sandwich, means for feeding the separator/plate sandwich from the table to a linear conveyor for conveying the sandwich through a sealing region past an array comprising extruder means to extrude a ribbon of plastics material into a side edge gap of the sandwich, and means for cutting off excess extruded material beyond the ends of the separators while travelling along the conveyor.

2. Apparatus according to claim 1, wherein said extruder means comprise generally opposed extruder heads respectively disposed at the two sides of the conveyor for simultaneous extrusion on to both side edges of the sandwich.

3. Apparatus according to claim 1, wherein the means for cutting off excess extruded material comprise a sensor, for sensing the passage of the ends of the separators, and a rotary cutter controlled by the sensor.

4. Apparatus according to claim 1, including a set of rollers or other pressure devices for squeezing the sealed edges of the sandwich to a desired thickness, and a cooling arrangement comprising a water-cooled block for accelerating setting of the plastics material and also for sizing the width of the sealed sandwich.

5. Apparatus according to claim 1, wherein a further conveyor leads at right angles from the end of the first conveyor and is operable to carry the sleeves past a further sealing array for sealing the ends to form pockets.

6. Apparatus according to claim 1, incorporating automatic sandwich assembly and comprising magazines associated with the assembly table to hold a supply of separators and plates, means for removing a first separator from the corresponding magazine and placing it on an assembly area of the table, means for moving a plate from the corresponding magazine to a position above the first separator and a support for holding the so-positioned plate clear of the first separator, means for removing a second separator from the corresponding magazine and placing it on the plate, and means for removing the support to allow the plate with the second separator to drop on to the first separator to provide the separator/plate sandwich assembly.

7. Apparatus according to claim 6, wherein said support comprises ledges movable from the sides into and out of the path of introduction of the plate, an centralising members are movable on to the opposite side edges of the plate after it has been allowed to drop on to the first separator.

8. Apparatus according to claim 6, wherein the means for feeding the sandwich to the first conveyor include a gripping device to hold the sandwich together while it is removed from the assembly table.

9. Apparatus according to claim 6, wherein separate magazines are provided to hold supplies of the said first and second separators, and the means for removing the separators comprise two vacuum pick-up pads operable in synchronism to pick up separators from the respective magazines therefor and to deposit them in turn on the assembly table.

10. Apparatus according to claim 6, wherein said means for moving a plate from the plate supply magazine comprise a reciprocating rod provided with a catch for engagement with a plate at the top of a stack thereof, this magazine having indexing means for raising the stack of plates so that the top one is at the correct level for engagement by the catch and displacement thereby to introduce that plate to the assembly region along said support, and said indexing means comprise a pair of chains with opposing ledges for supporting a stack of plates, with an indexing drive for the chains the operation of which is controlled by the position of the top plate.

* * * * *